United States Patent
Zhu et al.

(10) Patent No.: US 6,873,570 B2
(45) Date of Patent: Mar. 29, 2005

(54) HIGH RESOLUTION BATHYMETRIC SONAR SYSTEM AND MEASURING METHOD FOR MEASURING THE PHYSIOGNOMY OF THE SEABED

(75) Inventors: Weiqing Zhu, Beijing (CN); Xiaodong Liu, Beijing (CN); Min Zhu, Beijing (CN); Feng Pan, Beijing (CN); Xiangjun Zhang, Beijing (CN); Changhong Wang, Beijing (CN); Yuling Wang, Beijing (CN)

(73) Assignee: Institute of Acoustics Chinese Academy of Sciences, Beijing (CN)

( * ) Notice: Subject to any disclaimer, the term of this patent is extended or adjusted under 35 U.S.C. 154(b) by 0 days.

(21) Appl. No.: 10/450,944
(22) PCT Filed: Feb. 8, 2002
(86) PCT No.: PCT/CN02/00073
§ 371 (c)(1), (2), (4) Date: Jun. 18, 2003
(87) PCT Pub. No.: WO03/023446
PCT Pub. Date: Mar. 20, 2003

(65) Prior Publication Data
US 2005/0036404 A1 Feb. 17, 2005

(30) Foreign Application Priority Data
Sep. 13, 2001 (CN) .......................... 01142136 A

(51) Int. Cl.⁷ ............................................. G01S 15/89
(52) U.S. Cl. ........................................................ 367/88
(58) Field of Search ............................. 367/88, 13, 102

(56) References Cited
U.S. PATENT DOCUMENTS
5,200,931 A * 4/1993 Kosalos et al. ............... 367/88

6,226,227 B1  5/2001 Lent et al. .................. 367/104

FOREIGN PATENT DOCUMENTS
EP   0965860 A2  12/1999
EP   1085497 A2  3/2001
WO   WO9953635  10/1999

OTHER PUBLICATIONS

P. Kraeutner et al., "Beyond Interferometry, Resolving Multiple Angles-of-Arrival in Swath Bathymetric Imaging," Proceedings of the IEEE Oceans'99 Conference, pp. 37–45 (Sep. 1999).

P. Kraeutner et al., "Principal Components Array Processing For Swath Acoustic Mapping, " Proceedings of the IEEE Ocean'97 Conference, pp. 1246–1254, (Oct. 1997).

* cited by examiner

Primary Examiner—Daniel Pihulic
(74) Attorney, Agent, or Firm—Venable LLP; Manni Li

(57) ABSTRACT

A high resolution bathymetric sidescan sonar system for measuring micro-geomorphy of the sea bottom having an underwater vehicle, an underwater electronic subsystem mounted on the underwater vehicle and containing a transmitter and a receiver, and two sonar arrays mounted symmetrically on two sides of a lower part of the underwater vehicle and being connected to the underwater electronic subsystem through a cable. Each sonar array has a transmitting linear array and three or more parallel receiving linear arrays. The parallel receiving linear arrays are arranged at equal spaces, and the space d between two adjacent parallel receiving linear arrays is $\lambda > d \geq \lambda/2$, in which $\lambda$ is a wavelength of an acoustic wave, and an operation frequency of the parallel receiving linear arrays ranges from 30 kHz to 1200 kHz.

16 Claims, 10 Drawing Sheets

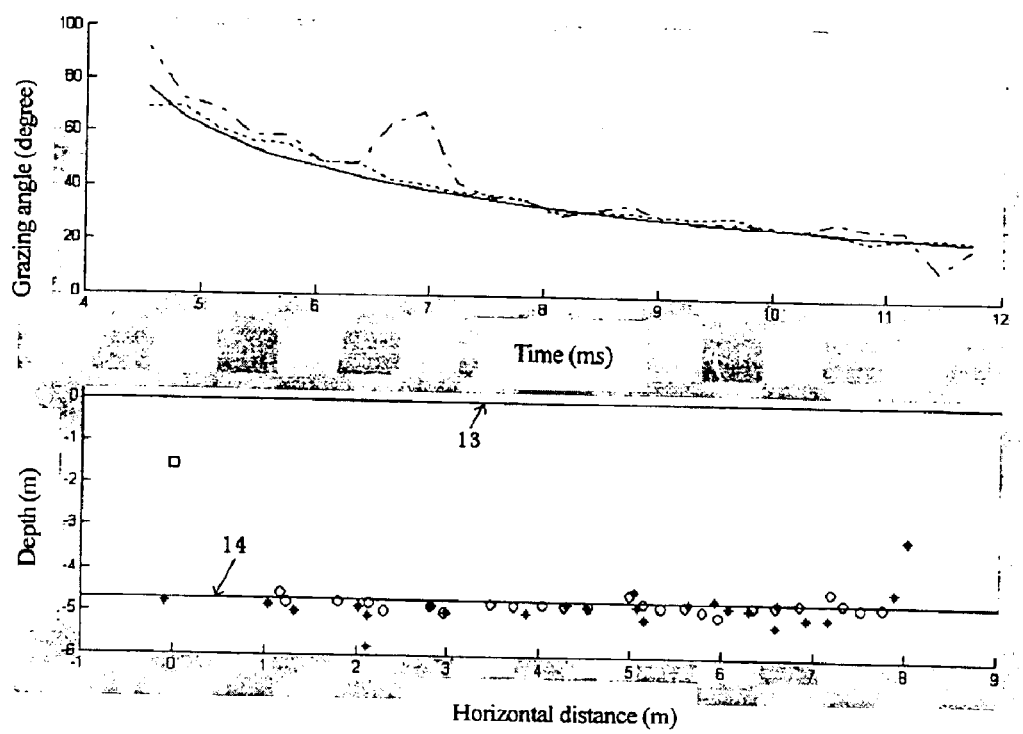
Figure 12a (upper)
Figure 12b (lower)
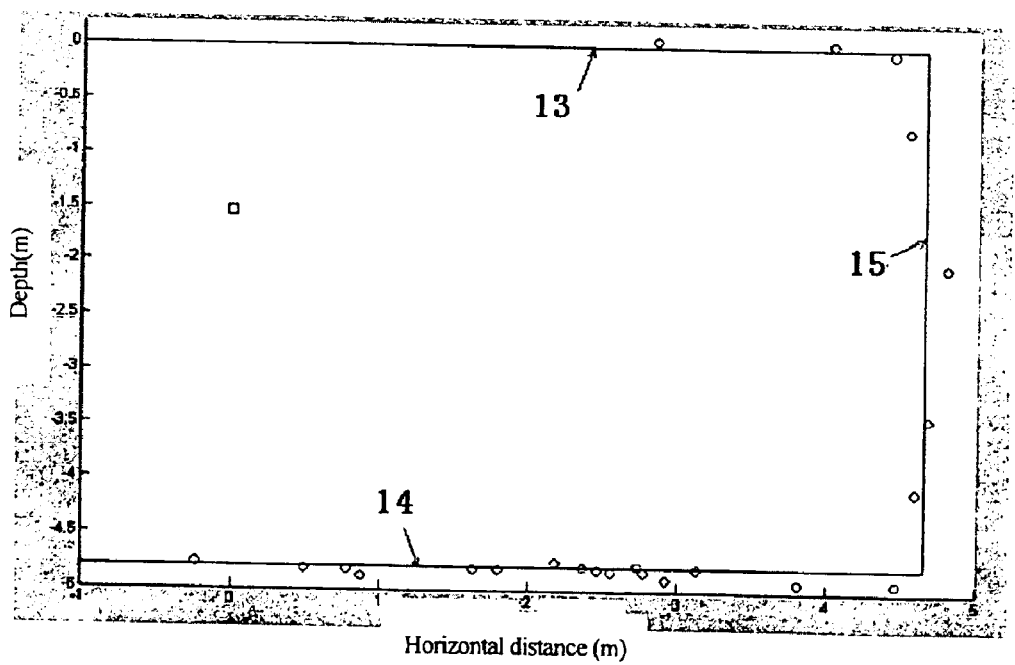
Figure 13

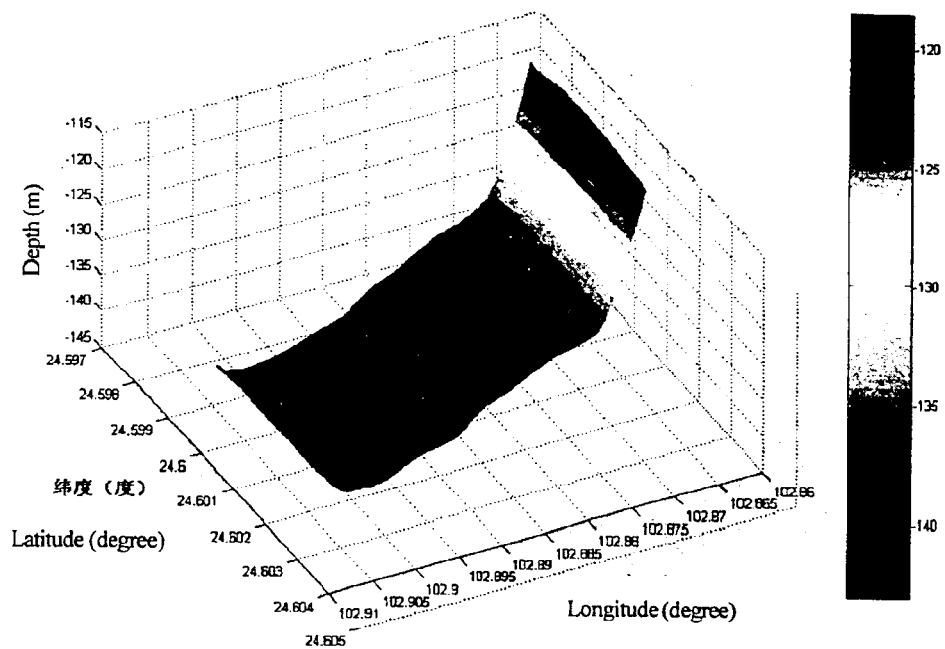
图 18
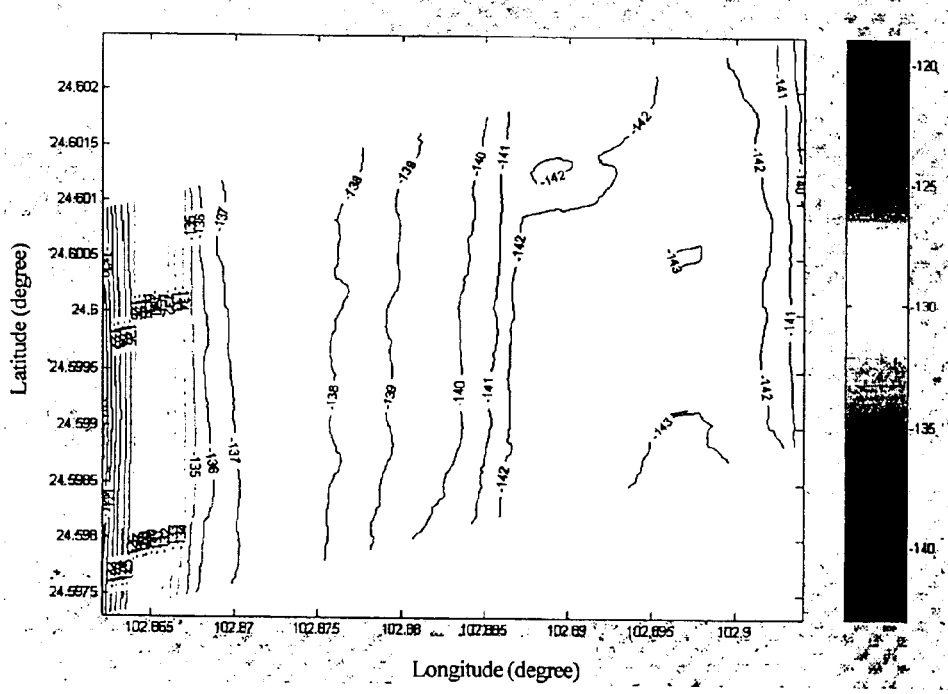
Figure 19

HIGH RESOLUTION BATHYMETRIC SONAR SYSTEM AND MEASURING METHOD FOR MEASURING THE PHYSIOGNOMY OF THE SEABED

FIELD OF THE INVENTION

The present invention relates to a high resolution sonar technology, more particularly, to a high resolution bathymetric sidescan sonar system and a method for measuring the micro-geomorphy of the sea bottom.

BACKGROUND OF THE INVENTION

The apparatuses and methods for measuring microgeomorphy of the sea bottom at present may be summarized as follows: For example, in a paper entitled "Principal Components Array Processing for Swath Mapping" by P. H. Kreautner and J. S. Bird in Proceedings of the IEEE Oceans' 97 Conference, October, 1997, and a paper entitled "Beyond Interferometry, Resolving Multiple Angles-of-Arrival in Swath Bathymetric Imaging" by P. H. Kreautner and J. S. Bird in Proceedings of the IEEE Oceans' 99 Conference, September, 1999, a sonar array comprised of six equal-spaced parallel linear arrays is presented. The parallel linear arrays are made of piezoelectric ceramic arranged at regular space and connected to the terminals of the pre-amplifiers and power amplifiers. A watertight house containing all of these parts is placed underwater and connected to an overwater electronic subsystem through a cable. It operates at a frequency of 300 kHz, and transmits simple pulse signal. A "principal component array processing" method is used in signal processing. The following experiments are performed:

(A) Measurements with a man-made target are performed in a pool. The man-made target is a good acoustic target made of orthogonal copper pipes. Said target is correctly detected by the sonar system, but the results of the measurements in connection to the wall of the pool are rather poor.

(B) Experiments are performed in a small lake. The depth of the lake is 2–30 meters. The sonar array is mounted on a common tripod, which is positioned on the lake bottom in front of a small dock. The electronic apparatus is placed on the shore. The results of the experiments show that the direct arrival echoes from the lake bottom are detected, but none of the multipath signals generated from the multipath effect is deleted automatically within the action range, these multipath signals are retained in the map.

(C) The normal sidescan map is obtained by rotating the sonar array positioned in the same small lake with a stepping motor. Only the intensity of the back scattering signal can be displayed on a normal sidescan map. Though the tendency of the variation of the landform of the lake bottom may be deduced from said map, the depth of water can not be obtained.

(D) The sonar array is moved back and forth on one side of a little ship. When the attitude correction is not adopted and the apparatuses for positioning and navigating is lacking, a three-dimensional acoustic image, i.e., the three-dimensional tendency of the variation of the landform of the lake bottom, is obtained. Said apparatus is unable to give the precision of depth measurement and contour map. The depth data in the vicinity of the nadir of the sonar are lacking for the experiments performed in the pool and lake with all of the prior art apparatuses and technologies.

There are two main defects in a prior art bathymetric sidescan sonar technology. First, the depth data in the vicinity of the nadir of the sonar can not be measured correctly, even said data may be obtained, the error of measurement is rather large. Second, the echoes arriving concurrently from different directions can not be differentiated, so that the apparatus can not work normally when the multipath effect exists in the underwater acoustic channel, or the landform is complex. Therefore, the precision of measurement, action range, operation efficiency, and adaptability of the sonar are limited seriously. A "principal component array processing" method is used by P. H. Kreautner and J. S. Bird to perform signal processing. Said method is capable of differentiating the echoes arriving concurrently from different directions basically, but it fails to select automatically the wanted echoes from the lake bottom. Besides, both the precision of measurement and the contour map can not be obtained.

In order to overcome the main defect of supplying a poor precision of measurement in the vicinity of the nadir of a prior art bathymetric sidescan sonar, three methods have been adopted ever. The first method is decreasing the distance between the survey lines, it always leads to a decrease of the action range of one side, thus makes the ranges of two successive measurements being overlapped each other and the efficiency is decreased notably. The second method is adding subbottom profiler at the center. The resolution is low, because the beam width of the conic beam of said instrument is about 40°. In addition, because of its lower frequency, the penetration depth of the conic beam into the sea bottom of the water is rather large, this leads to a lower precision of depth measurement. The third measure is adding a minitype multi-beam sounding system, thus the complexity of the equipment and the price of the equipment are increased.

Second, the prior art method of signal processing of the bathymetric sidescan sonar is the differential phase estimation method. Because the echoes arriving concurrently from different directions can not be differentiated when using said method, the action range and the adaptability of the prior art bathymetric sidescan sonar are limited seriously. In addition, when working on a complex landform, a plurality of echoes arriving concurrently from different directions may be generated, thus the precision of measurement of a prior art bathymetric sidescan sonar will decrease significantly.

SUMMARY OF THE INVENTION

The main object of the invention is to overcome the defects and inadequacies of the prior art. One problem concerns the poor precision of depth measurement obtained by using a prior art bathymetric sidescan sonar system and technology when the vicinity of the nadir of the sonar is measured, and the other problem concerns being incapable of providing contour map.

The another object of the invention is to solve the problem concerns the method of signal processing of a prior art bathymetric sidescan sonar, wherein the echoes arriving concurrently from different directions can not be differentiated, so the action range and the adaptability of a prior art bathymetric sidescan sonar are limited seriously, and the precision of measurement will decrease significantly when working on a complex landform.

The further object of the invention is to apply the high resolution bathymetric sidescan sonar system to an underwater vehicle such as autonomic underwater vehicle (AUV), remotely operated vehicle (ROV), and towed body, and make said sonar system more practical.

To sum up, the invention is capable of providing a high resolution bathymetric sidescan sonar system having increased precision of measurement, action range, and operation efficiency for measuring the submarine micro-geomorphy.

The objects of the invention are realized as follows: the high resolution bathymetric sidescan sonar system for measuring the submarine micro-geomorphy provided by the invention comprises an underwater electronic subsystem mounted on an underwater vehicles and two sonar arrays mounted symmetrically on the two sides of the lower part of the underwater vehicles. The sonar arrays connected to the underwater electronic subsystem through a cable. Its characteristics are that said sonar array comprises a transmitting linear array for transmitting linear frequency modulated (chirp) signal and three or more parallel receiving linear arrays made of piezoelectric ceramic and arranged at equal spaces; wherein the transmitting linear array is connected to the last stage of a power amplifier in the underwater electronic subsystem, the parallel receiving linear arrays are connected to the preamplifier of a receiver in the underwater electronic subsystem, the space between the adjacent parallel receiving linear arrays is d, $\lambda > d \geq \lambda/2$, in which $\lambda$ is the wavelength of the acoustic wave, $d = \lambda/2$ is preferred, the operation frequency of the parallel receiving arrays ranges from 30 kHz to 1200 kHz.

The structure diagram of said high resolution bathymetric sidescan sonar system is shown in FIG. 2. A host computer controls the operation of the whole system, and sends the control signal to the transmitter and receiver by a controller. The transmitter drives the transmitting linear arrays of the sonar arrays positioned at left and right sides transmit acoustic wave laterally, the acoustic echoes from the sea bottom are received successively by the parallel receiving linear arrays of the sonar arrays according to the order of time. The parallel receiving linear arrays convert the acoustic echoes from the sea bottom into electrical signals and feed them to the receiver. The output signal of the receiver is converted into digital signal by the acquisition of a multiple channel A/D converter, then said digital signal is sent to a high-speed digital signal processor. The bathymetric data is obtained after performing various operations in the high-speed digital signal processor. The results are sent to the host computer. Through the controller the data from an attitude sensor and a temperature sensor are also sent to the host computer. These results are stored in a hard disk or sent to an overwater computer over an Ethernet link. Therefore, when the underwater vehicle moves forward continuously, the acoustic waves are transmitted and the echoes from the sea bottom are received, thus the depth data are obtained continuously. A contour map of a certain area of a sea bottom can be obtained after a period of time (see FIG. 1).

Wherein said underwater electronic subsystem comprises: the receivers, the transmitters, the multiple channel A/D converter, the high speed digital signal processor, the I/O controller, and the host computer. In which the transmitting linear array of the sonar array is connected electrically to the last stage of the power amplifier, the parallel receiving linear arrays are connected electrically to the preamplifier of a receiver, the receivers are connected electrically to a multiple channel A/D converter, the multiple channel A/D converter is connected electrically to a high speed digital signal processor, the high speed digital signal processor is connected electrically to the host computer that have a hard disk, and the I/O controller is connected electrically with the host computer, the transmitter, and the receivers (see FIG. 2).

Said underwater electronic subsystem further comprises an attitude sensor and/or a temperature sensor, they are connected electrically to the host computer via the I/O controller.

In addition, in order to debug the whole underwater electronic subsystem, an overwater computer connected to the host computer over an Ethernet link may be included.

Wherein said receivers (see FIG. 3) are comprised of two receiver boards, the number of the channels and the operation frequency of each of the receiver board are the same as those of the parallel receiving array to which said receiver board is connected. Each of the receiver board is comprised of a preamplifier, a time-varying gain controller, a band pass filter, a quadrature demodulator, two low pass filters, and two buffer amplifiers. In which the weak signal received by a transducer is sent into the input terminal of the preamplifier, the output terminal of the preamplifier is connected to the input terminal of the time-varying gain controller, the output terminal of the time-varying gain controller is connected to the input terminal of the band pass filter, the output terminal of the band pass filter is connected to the input terminal of the quadrature demodulator, each of the two output terminals of the quadrature demodulator is connected to the input terminal of a low pass filter, each of the two output terminals of the two low pass filters is connected to the input terminal of a buffer amplifier, and each of the two outputs of the two buffer amplifiers is fed to the multiple channel A/D converter.

Wherein said transmitters (see FIG. 4) are comprised of two transmitter boards, the operation frequency of each of the transmitter board is the same as that of the transmitting linear array to which said transmitter board is connected. The transmitter is comprised of a carrier frequency generator, a signal converter, a driving stage, a power stage, and a transformer. In which the gate control signal output from the I/O controller is fed to the input terminal of the signal converter, the output of the carrier frequency generator is fed to the input terminal of the signal converter, the output terminal of the signal converter is connected to the input terminal of the driving stage, the output terminal of the driving stage is connected to the input terminal of the power stage, the output terminal of the power stage is connected to the input terminal of the transformer, and the output terminal of the transformer is connected to the sonar array.

Wherein said multiple channel A/D converter is used basically to performing data acquisition on the multiple channel quadrature echo signals processed by the receiver. Said multiple channel A/D converter is comprised of a multiple channel analog switch, an A/D converter, a FIFO memory, a logical controller, a clock generator, and DSP extended bus interface. In which the output terminal of the multiple channel analog switch is connected to the input terminal of the A/D converter, the output terminal of the A/D converter is connected to the input terminal of the FIFO memory, the output terminal of the FIFO memory is connected to the DSP extended bus interface, the output terminal of the clock generator is connected with the logical controller, the output of the logical controller is sent respectively to the control signal input terminals of the multiple channel analog switch, the A/D converter, and the FIFO memory, the logical controller is also connected with the DSP extended bus interface. The diagram of the multiple channel A/D converter is shown in FIG. 5.

Said high speed digital signal processor (see FIG. 6) is comprised of a digital signal processing chip, a dual port RAM, a static RAM (SRAM), a logical controller, a host computer bus interface, and a DSP extended bus interface. In which said high speed digital signal processor chip is connected to one input terminal of the dual RAM, the other input terminal of the dual port RAM is connected with the host computer bus interface, the high speed digital signal processor chip is further connected with the static RAM and the DSP extended bus interface, the logical controller is connected with the high speed digital signal processor chip, the static RAM, the dual port RAM, and the host computer bus interface.

Said I/O controller (see FIG. 7) is comprised of the OC gate digital output port, an 8-bit digital input port, a timer, a logical controller, and a host computer bus interface. In which said logical controller is connected with the host computer bus interface, the timer, the OC gate digital output port, the 8-bit digital input port, and the D/A converter.

The method of the invention for measuring the submarine micro-geomorphy comprises the follow steps:

(1) Selecting a suitable underwater vehicle according to the customer's demands, said underwater vehicle may be, for example, an AUV, a tethered ROV, a towed system, or a boat;

(2) Drafting a preliminary overall specifications according to the customer's demands, combining the theoretical formula of the standard deviation of phase of the space-time correlation function of the sonar system with the sonar equation to perform the design, selecting the main specifications, such as the operation frequency, the action range, and the pulse width of the sonar, and the length of the sonar array;

(3) Based on the theoretical expression of the phase additional factor in the space-time correlation function of the sonar array, selecting the beam width of the element unit of the linear array of the sonar array and the space between the linear arrays, thus a good precision of measurement in measuring in the vicinity of the nadir of the sonar system may be obtained;

(4) Selecting the main parameters and repeating the calculations in steps (2), (3) until the main parameters of the sonar are fulfilled basically;

(5) Making a decision on the number of the equal-spaced parallel linear arrays to be used, in which the number equals or greater than three, then performing the analogous calculation with the SBAD-MSADOAE (Sea Bottom Automatic Detection—Multiple Subarray Directions Of Arrival Estimation) method of the invention, determining preliminarily the resolution of the sonar and the ability for overcoming the multipath effect;

(6) Determining the respective main parameters of the sonar, if the demands are not met, then the steps (2), (3), (4) and (5) are repeated, until the respective main parameters of the sonar are determined, then manufacturing two prototypes of sonar array;

(7) Testing the two prototypes of sonar array manufactured in step (6) in a pool; first, measuring the echoes from the pool bottom, comparing the measured depth values of the pool with its true depth values, including the depth values of the pool in the vicinity of the nadir of the sonar, the measured values should coincide well with the corresponding true values; second, measuring the outline of the pool including its wall corners, the measured values should coincide basically with the corresponding true values, then the out door tests may be performed;

(8) Performing the tests on a lake or sea: testing the sonar array mounted on an underwater vehicle; performing the data processing after tests; first, comparing the depth values measured by the sonar in the vicinity of the nadir of the sonar with the depth values measured by a high precision bathymeter, they should be coincidental well; second, operating the underwater vehicle in a case in which rather serious multipath effect exists, determining the ability of overcoming the multipath effect by the measured data, the correct depth values of the bottom of the water may be given on the finally obtained maps, without any multipath signal interference;

(9) Merging the data measured by sonar with the data from the attitude sensor on the vehicle and the positioning data to give a contour map;

(10) Giving a grey scale map of the acoustic back scattering signal;

(11) Making the maps, which the customer needs according to the customer's demands.

The operation procedure of the system of the invention is stated as follows:

First, the host computer feeds a gate control signal to two transmitters via an I/O controller, then the transmitters generate high power linear frequency modulated (chirp) electrical pulses to drive the transmitting linear arrays mounted on two sides, the transmitting linear arrays convert the chirp electrical pulses into acoustic pulse signal and transmit it to the sea bottom; after transmitting, the host computer commands a high speed digital signal processor to start a multiple channel A/D converter, mean while the host computer feeds a time-varying gain control (TGC) signal to receivers via the I/O controller, the receivers start to receive the signals received by the parallel linear arrays mounted on two sides, after amplifying by the receivers, and passing through a filter, a quadrature demodulator, the signals are changed into digital signals, then the digital signals are inputted to a high speed digital signal processor, the high speed digital signal processor processes the digital signals, the results are inputted to the host computer and stored on a hard disk; when an attitude sensor and a temperature sensor are set in the apparatus, the data from the attitude sensor and the temperature sensor in this time period are also inputted to the host computer through the I/O controller and stored on the hard disk; up to now a normal operation period of a high resolution bathymetric sidescan sonar system is finished, the next normal operation period of the system shall follow closely, only shutting off the electricity supply can stop the operation of the system. The flow diagram of the program run in the host computer is shown in FIG. 11.

The advantages of the invention are:

(1) The sea bottom is regarded as a thin layer generating backscatter echoes when using the high resolution bathymetric sidescan sonar system and method of the invention to measure the micro-geomorphy of the sea bottom. The measured result of said bathymetric sidescan sonar system is shown in FIG. 14. In said figure, the real line represents the theoretical values; the dotted line represents the measured values. It can be seen from this figure that the measured values are in coincidence with the corresponding theoretical values. However, in the prior art, the sea bottom is assumed as a zero thickness surface which generates the back scatter echoes, $d=0.7\lambda$ is selected when the sidelobe of the sonar array is considered. In the prior art, the reason of causing the error in measuring the nadir of the sonar is not concerned, and the precision of depth measurement is not given. In the invention, the sea bottom is considered as a thin layer generating back scatter signal, an additional term called phase additional factor $\xi$ occurs in the derived expression of the phase of the space-time correlation function of the sonar array of the bathymetric sidescan sonar as compared with the corresponding expression of the ordinary theory. The $\xi$ term lowers the precision of depth measurement when the measured place is in the nadir of the sonar system. As shown in FIG. 8, the space d used in the invention is: $\lambda > d \geq \lambda/2$, this reasonable design parameter is given after analyzing the phase additional factor. It can be seen from FIG. 8 that when the space d between the parallel arrays of the sonar array equals or less than wavelength$\lambda$, $\xi$ can affect the precision of depth measurement only in a narrow angular width. When $d=\lambda/2$, the effect of $\xi$ is minimum. The theoretical values and the experimental values of the standard deviation of the phase in the sonar space-time correlation function are coincidental well, thus the reason of causing the error in measuring the depth of the nadir of the sonar system is found in the invention. Because of this reason, the precision of depth measurement in measuring the depth of the nadir of the sonar system is improved greatly. The real precision of depth measurement is superior to 1%.

(2) When measuring with the bathymetric sidescan sonar system of the invention, a signal processing method named SBAD-MSADOAE method researched and invented by us is adopted. The method is capable of differentiating the echoes arriving concurrently from different directions, detecting and tracking correctly the directly arriving echoes from the sea bottom, and deleting the interferential multi-path echoes. In connection to the concrete operation situation, for example, deep sea or shallow water, a suitable number of the subarrays may be selected, thus the detection performance can be improved significantly. Adopting reasonable method of signal processing results in increasing the distinguishability on the coherent signals. In FIGS. 16 and 17 obtained by said method, the multipath signal caused by the multipath effect can not be found.

(3) The high resolution bathymetric side scan sonar system of the invention may be mounted on an AUV. The practical measurements are performed when the arrays mounted on the both sides operate concurrently. The precision of depth measurement and the contour map are given in FIGS. 18 and 19 after correcting the errors.

DESCRIPTION OF THE DRAWINGS

FIG. 12 is a figure for comparing the experimental data of a pool obtained by using respectively the method of the invention and the prior art method. The detected target is the pool bottom. Because the multipath effect exists, the method of the invention is superior to the prior art method. The method of the invention is capable of giving the depth data in the vicinity of the nadir of the sonar.

FIG. 12(a) (upper) is a figure showing the relationship between the grazing angle and the time. In the figure, - (real line) represents the result of the theoretical value, - - - (dash line) represents the result obtained by the method of the invention, -•- (dash dot line) represents the result obtained by the prior art method. It can be seen from the figure that the SBAD-MSADOAE method of the invention is significantly superior to the prior art method.

FIG. 12(b) (lower) is a figure showing the relationship between the depth and the distance. In the figure, the mark □ (square) shows the position of the transducer, the mark○ (circle) represents the results obtained by the method of the invention, and the mark*(star) represents the results obtained by the prior art method. The figure shows that the method of the invention is significantly superior to the prior art method.

FIG. 13 shows the results detected for the wall of the pool (the corners of the pool are included) by the method of the invention. In the figure, the mark □ (square) shows the position of the transducer, and the mark ○ (circle) represents the result obtained by the method of the invention. The results are in coincidence basically with the outline of the pool. Because of serious multipath effect, the prior art method fails to give any useful data.

FIG. 16 are figures showing the comparison of the data obtained respectively by the SBAD-MSADOAE method of signal processing of the invention and the prior art method for an acoustic emission on the starboard. The data obtained by the method of the invention are still reasonable until the number of the beam reaches 200–250 and the horizontal distance reaches 200–250 m; while the data obtained by the prior art method can be regarded as reasonable only when the number of beams does not exceed 80 and the horizontal distance is less than 80 m. In which

FIG. 17 are figures showing the comparison of the data obtained respectively by the SBAD-MSADOAE method of signal processing of the invention and the prior art method for an acoustic emission on the port. The conclusions are the same as those deduced for FIG. 16. In which

In FIGS. 15–17, - (real line) represents the results obtained by the method of the invention; - - - (dash line) represents the results obtained by the prior art method.

FIG. 18 is a three-dimensional depth profile map, which is obtained with the data obtained from 300 acoustic emissions transmitted by the high resolution bathymetric sidescan sonar system.

FIG. 19 is a contour map, which is obtained with the data obtained from 300 acoustic emissions transmitted by the high resolution bathymetric sidescan sonar system.
Wherein, 1-underwater electronic subsystem 2-underwater vehicle 3-left sonar array 4-right sonar array 5-receiving linear array A 6-receiving linear array B 7-receiving linear array C 8-receiving linear array D 9-transmitting array 10-receiving array 11-received electrical signal 12-transmitted electrical signal 13-surface of water 14-pool bottom 15-pool wall.

DETAILED DESCRIPTION OF THE INVENTION

Figure 1:
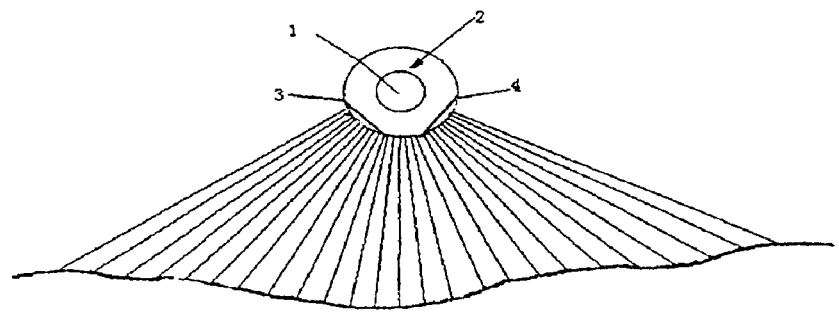
FIG. 1 is a diagram of the structure of the invention.
Figure 2:
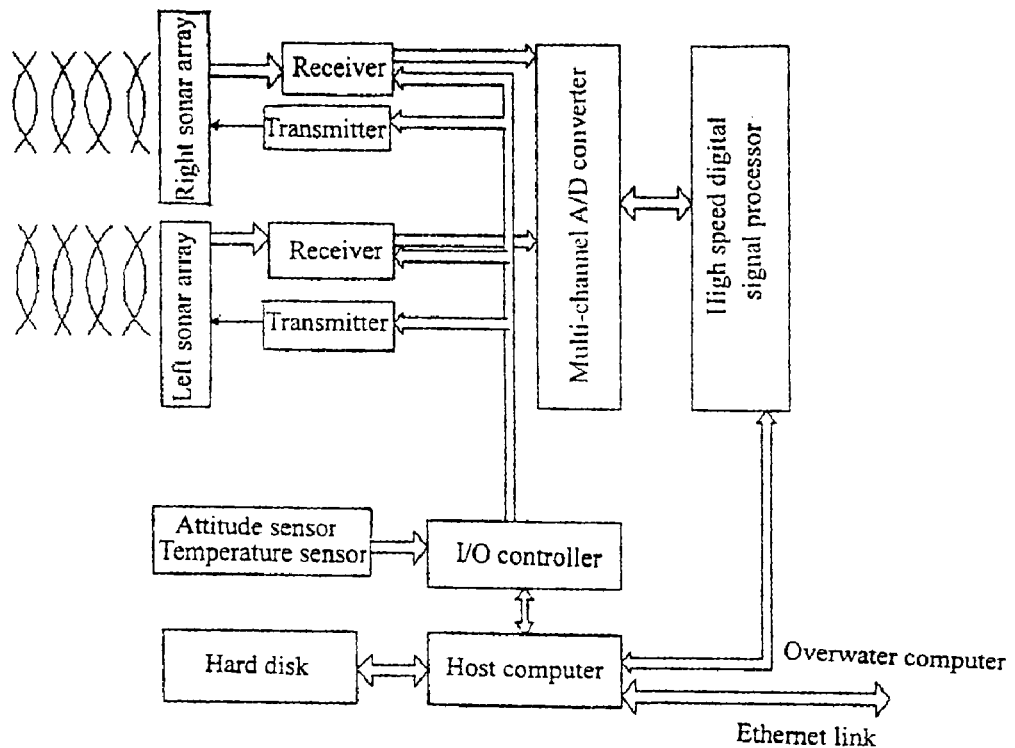
FIG. 2 is a block diagram of the structure of the high resolution bathymetric sidescan sonar system of the invention.
Figure 3:
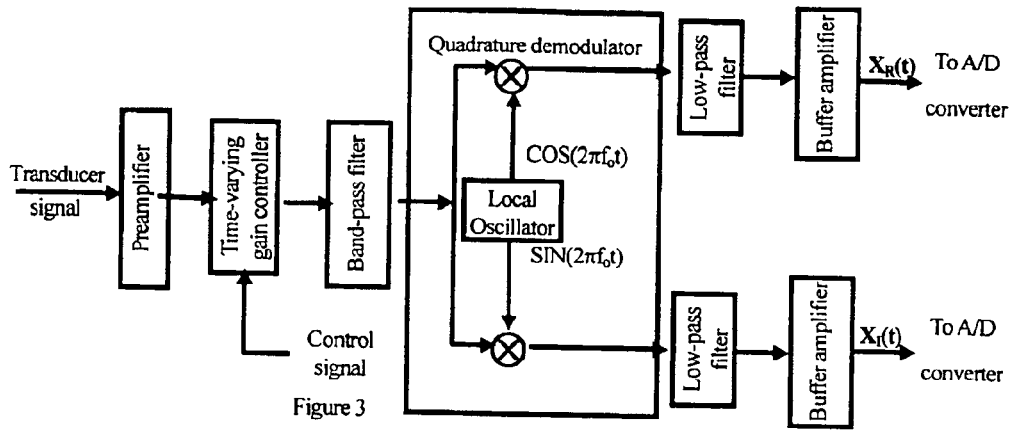
FIG. 3 is a diagram of the circuital structure of one channel of the receiver of the high resolution bathymetric sidescan sonar system of the invention.
Figure 4:
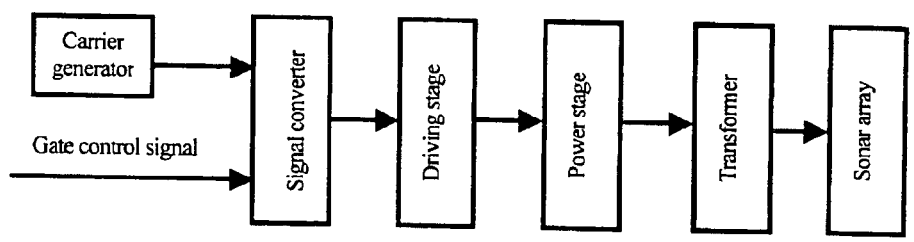
FIG. 4 is a diagram of the circuital structure of the transmitter of the high resolution bathymetric sidescan sonar system of the invention.
Figure 5:
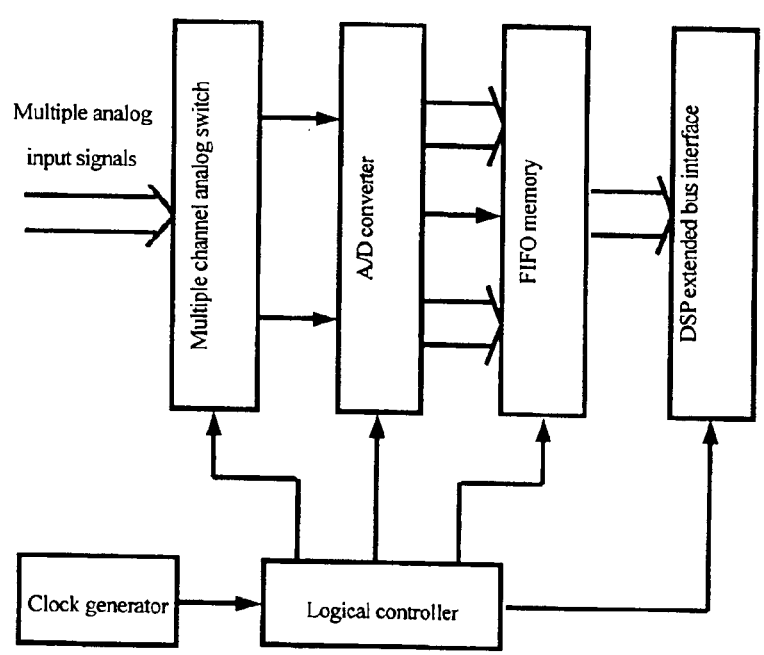
FIG. 5 is a diagram of the circuital structure of the multiple channel A/D converter of the high resolution bathymetric sidescan sonar system of the invention.
Figure 6:
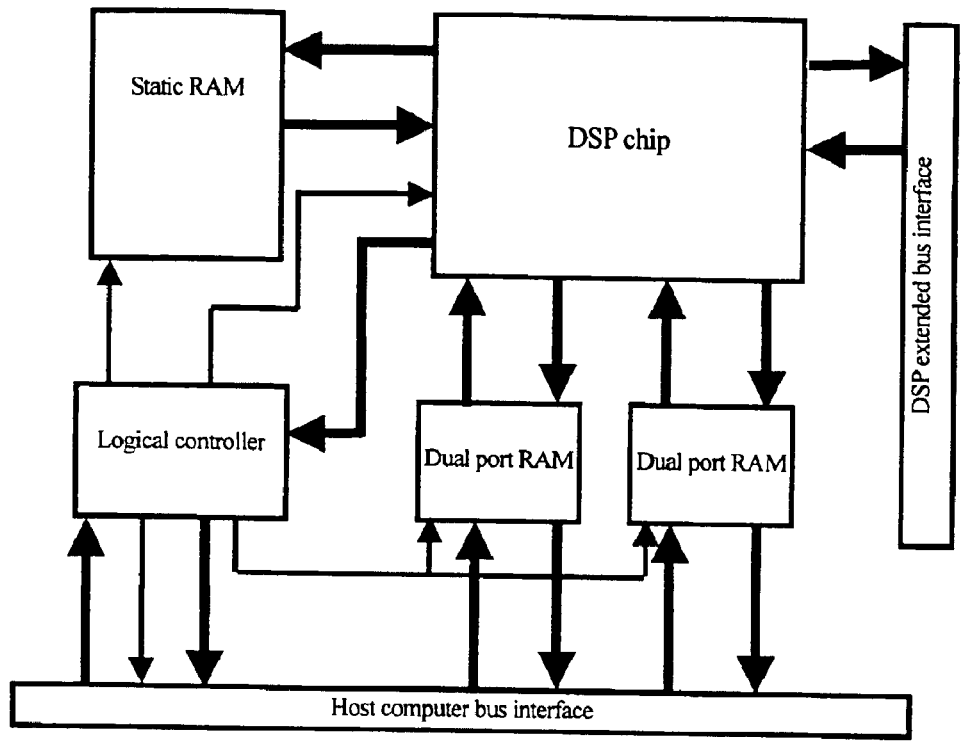
FIG. 6 is a diagram of the circuital structure of the high speed digital signal processor of the high resolution bathymetric sidescan sonar system of the invention.
Figure 7:
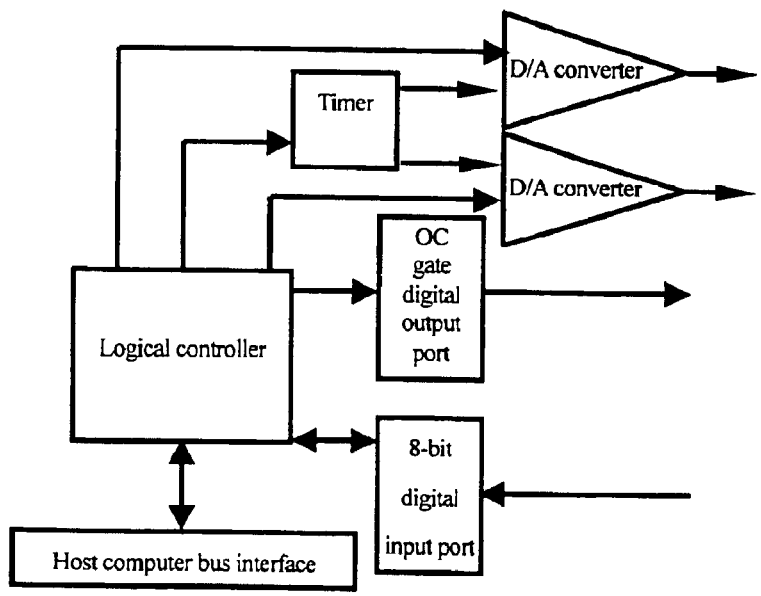
FIG. 7 is a diagram of the circuital structure of the I/O controller of the high resolution bathymetric sidescan sonar system of the invention.
Figure 8:
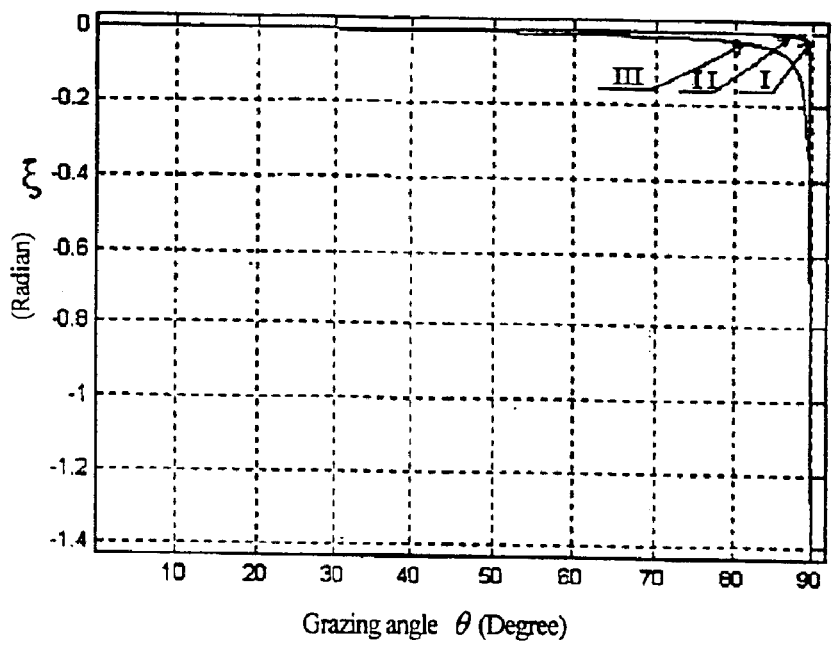
FIG. 8 is a figure showing the relationship between the phase additional factor $\xi$ and the acoustic wave grazing angle $\theta$. Curve I is the result when $d=0.5\lambda$, Curve II is the result when $d=\lambda$, Curve III is the result when $d=10\lambda$. It can be seen from the figure that the effect of $\xi$ is rather small when $d \geq \lambda$, and the effect of $\xi$ is minimum when $d=0.5\lambda$.
Figure 10:
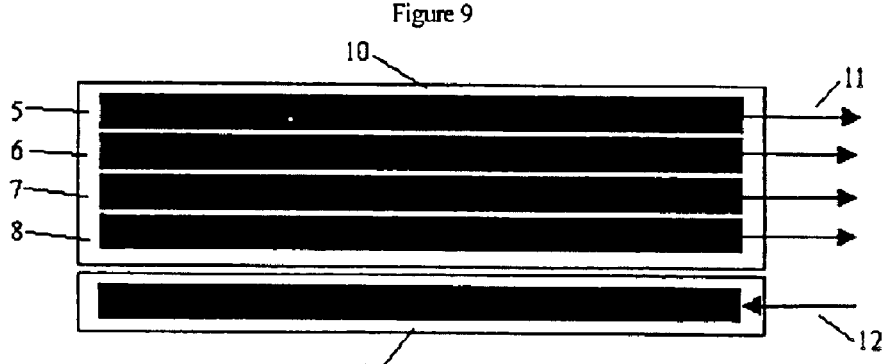
FIG. 10 is a diagram of the structure of the sonar array of the high resolution bathymetric sidescan sonar system of the invention.
Figure 11:
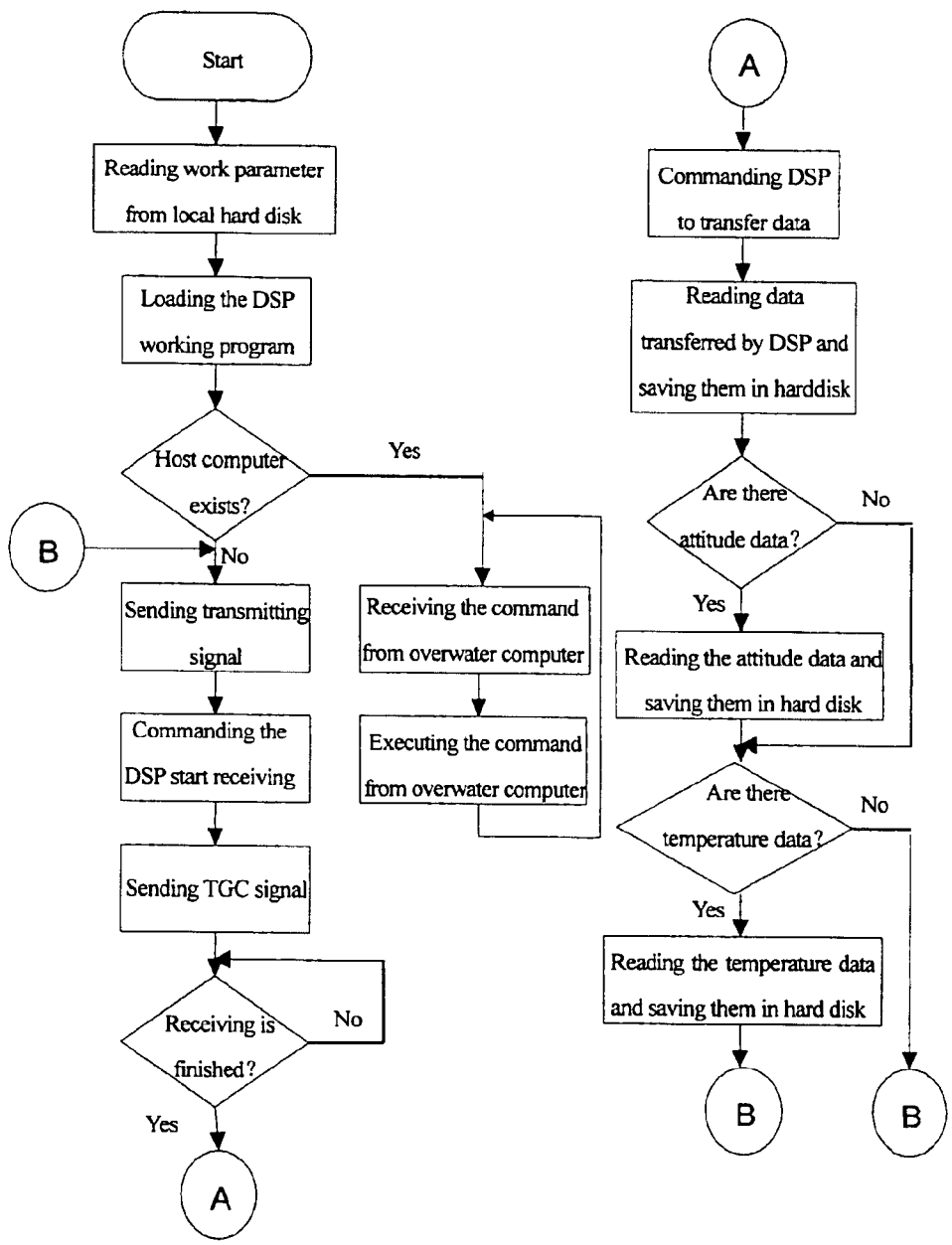
FIG. 11 is a flow diagram illustrating the program stored in the memory of the computer for controlling the high resolution bathymetric sidescan sonar system of the invention.

Embodiment 1:

A high resolution bathymetric sidescan sonar system for measuring the micro-geomorphy of the sea bottom is manufactured according to FIGS. 1 and 2. The targets to be detected are the pool bottom, the pool wall and the surface of water. Said sonar system comprises: any one of the sonar arrays 3, 4 dipped into a pool by a dipping means, the sonar array is connected to the underwater electronic subsystem with a cable, the underwater electronic subsystem is placed on a working table on the surface of the water. Each of the sonar array is comprised of one transmitting linear array for transmitting linear frequency modulated (chirp) signals and four parallel linear arrays A, B, C, D arranged at equal space and made of piezoelectric ceramic. The space between two adjacent parallel receiving arrays d=$\lambda$, $\lambda$=2 cm. The length of the linear array is 70 cm. The operation frequency ranges from 30 kHz up to 1200 kHz. The transmitting array 9 is connected to the last stage of a power amplifier of the transmitter of the underwater electronic subsystem 1, the parallel receiving linear arrays A–D are connected to a preamplifier of a receiver of the underwater electronic subsystem 1, the receiver is electrically connected to a multiple channel A/D converter, the multiple channel A/D converter is electrically connected to a high speed digital signal processor, the high speed digital signal processor is electrically connected to a host computer that have a hard disk, an I/O controller is electrically connected with the host computer, the transmitter, and the receiver. The sonar system is shown in FIG. 10. The operation frequencies of the two sides of the sonar are 70 kHz and 80 kHz, respectively. The connection relationship between the respective parts of the underwater electronic subsystem of the high resolution bathymetric sidescan sonar and the sonar arrays is shown in FIG. 2. The host computer feeds a gate control signal to the two transmitters via an I/O controller, then the transmitters generate high power linear frequency modulated (chirp) electrical pulses to drive the transmitting linear arrays on the two sides, the transmitting linear arrays convert the chirp electrical pulses into acoustic pulse signal and transmit it toward the sea bottom; after transmitting, the host computer commands a high speed digital signal processor to start a multiple channel A/D converter, mean while the host computer feeds a time-varying varying gain control (TGC) signal to receivers via the I/O controller, the receivers start to receive the signal received by the parallel linear arrays on the two sides, after amplifying by the receivers, and passing through a filter, a quadrature demodulator, the signals is changed into digital signals, then the digital signals are inputted to a high speed digital signal processor, the high speed digital signal processor processes the digital signals, the results are inputted to the host computer and store on a hard disk; when an attitude sensor and a temperature sensor are set in the apparatus, the data from the attitude sensor and the temperature sensor in this time period are also inputted to the host computer through the I/O controller and store on the hard disk. The constituting parts are illuminated respectively as follows: FIG. 3 is a circuit diagram of one channel of the receiver. Each of the channels comprises: a preamplifier, a time-varying gain controller, a band pass filter, a quadrature demodulator, two low pass filters, and two buffer amplifiers. They are connected in sequence according to the run of the signal shown in FIG. 3. The part corresponding to each of the blocks in FIG. 3 is a commercially available special-purpose chip. FIG. 4 is a circuit diagram of the transmitter comprising a signal converter, a driving stage, a power stage, and a transformer. They are connected in sequence according to the run of the signal shown in FIG. 4. All of them, except the transformer, are commercially available. The transformer is a normal pulse transformer. FIG. 5 is a block diagram of the multiple channel A/D converter comprising: an analog input unit, a multiple channel analog switch, an A/D converter, a FIFO memory, a logical controller, a clock generator, a host computer bus interface, and a DSP extended bus interface. They are connected in sequence according to the run of the signal shown in FIG. 5. FIG. 6 is a block diagram of the high speed signal processor comprising: a chip for digital signal processing, a dual port RAM, a static RAM (SRAM), a logical controller, and a DSP extended bus interface. They are connected in sequence according to the run of signal shown in FIG. 6. FIG. 7 is a block diagram of the circuit of the I/O controller comprising: an OC gate digital output unit, an 8-bit digital input unit, a timer, a D/A converter, a logical controller, and a host computer bus interface. They are connected in sequence according to the run of the signal shown in FIG. 7. Each of the digital chips in FIGS. 5, 6, 7 is a commercially available general-purpose chip. The measured results for the pool bottom using the SBAD-MSADOAE method of the invention and the prior art method are given in FIG. 12. In FIG. 12a, the dash line represents the results obtained by the SBAD-MSADOAE method of the invention, the dash and dot line represents the results obtained by the prior art method (differential phase method), and the real line represents the theoretical values. It can be seen from the figure that the results obtained by the method of the invention are close to the theoretical values, and significantly superior to the prior art method. The position of the sonar array is notated in FIG. 12b. The mark ⁵ represents the results of the method of the invention, the mark * represents the results of the prior art method. The results obtained by the method of the invention are significantly close to the bottom of the pool marked with real line. The targets to be detected in FIG. 13 are the pool bottom, the pool wall and the surface of the water, and the pool corners are included as well. The data in FIG. 13 is obtained by the method of the invention, which are in coincidence with the pool bottom basically. The useful data can not be obtained by the prior art method because of the serious multipath effect. It can be seen from the figure that not only the depth of nadir of the sonar, but also the positions of the wall of the pool and the surface of the water can be detected. These can not be detected by the prior art method.

Figure 9:
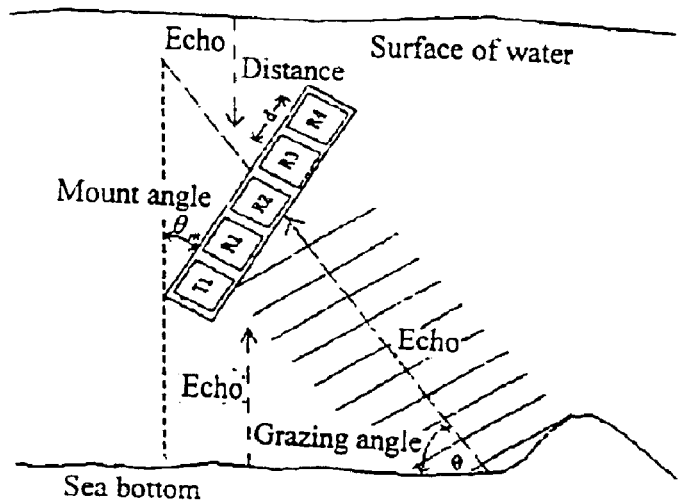
FIG. 9 is a diagram of the geometrical situation of the operation of the high resolution bathymetric sidescan sonar system of the invention. It can be seen from the figure that a plurality of echoes may be generated by the sea bottom and the surface of the water; this is the so-called multipath effect of the underwater acoustic channels. In addition, the complex sea bottom is also capable of generating a plurality of echoes arriving concurrently from different directions.

It can be seen from FIG. 9 the geometrical situation of the operation of the high resolution bathymetric sidescan sonar system. The echoes from different directions may arrive the sonar array concurrently because of the multiple reflection of the surface of the water and the sea bottom, and the echoes generated due to the complex bottom landform. In order to differentiate these echoes and find out the required echoes from the sea bottom, two sonar arrays are developed by the inventor. They are mounted on both two sides of the underwater vehicle. Each of the sonar arrays comprises a transmitting array and four parallel receiving linear arrays. The operation frequency ranges from 30 kHz to 1200 KHz. The transmitting array transmits linear frequency modulated (chirp) signal. The arrangement of the sonar array is shown in FIG. 10. 16 space-time correlation functions can be obtained with four parallel receiving linear arrays, and a 4×4 matrix is constructed with these 16 space-time correlation functions. This matrix contains a great amount of information concerning the amplitude, phase, frequency, and grazing angle of the echoes. One of the principal objects of the invention is to solve this matrix and separate the echoes arriving concurrently from different directions.

Figure 15:
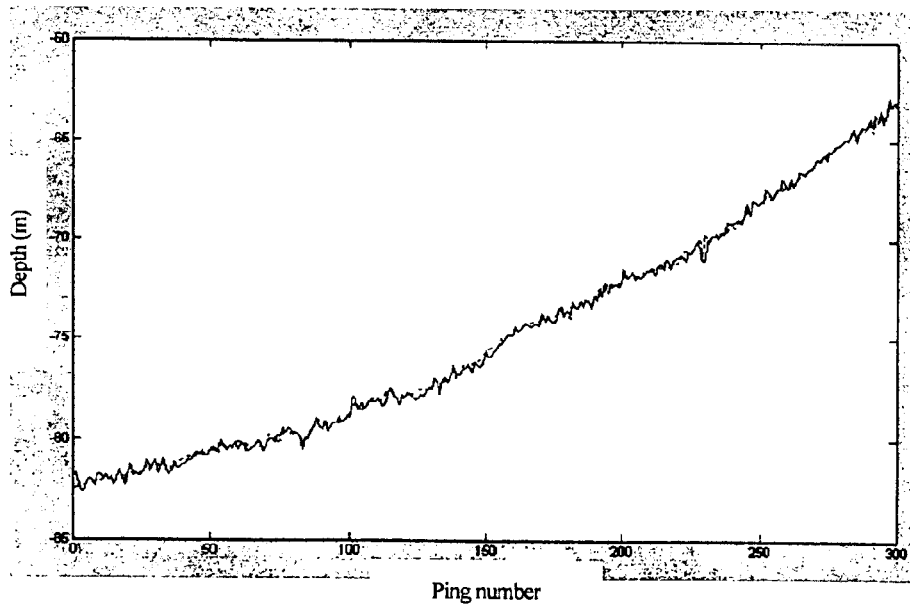
FIG. 15 is a figure showing the comparison of the depth data measured in the vicinity of the nadir of the sonar between the system of the invention and a high precision depth sounder; both of them are mounted on an AUV. It can be seen from the figure that the results obtained from them are coincidental well. The main specifications of the high precision depth sounder are: operation frequency: 300 kHz, beam width 4°, pulse width 0.1 ms, transmitting 10 times per second.
Figure 16A:
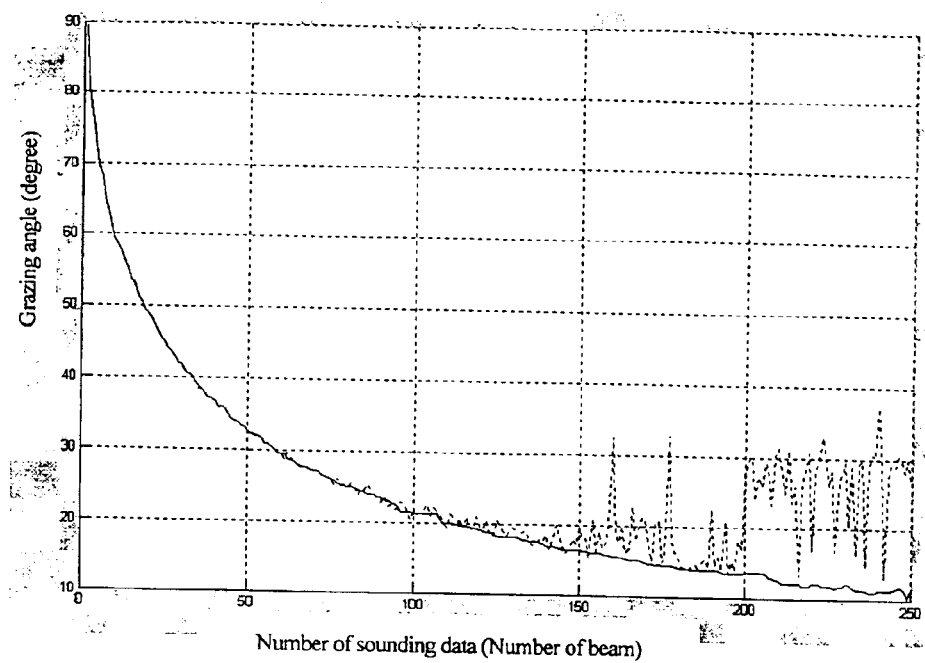
FIG. 16a is a figure shows the relationship between the number of the beams and the grazing angle.
Figure 16B:
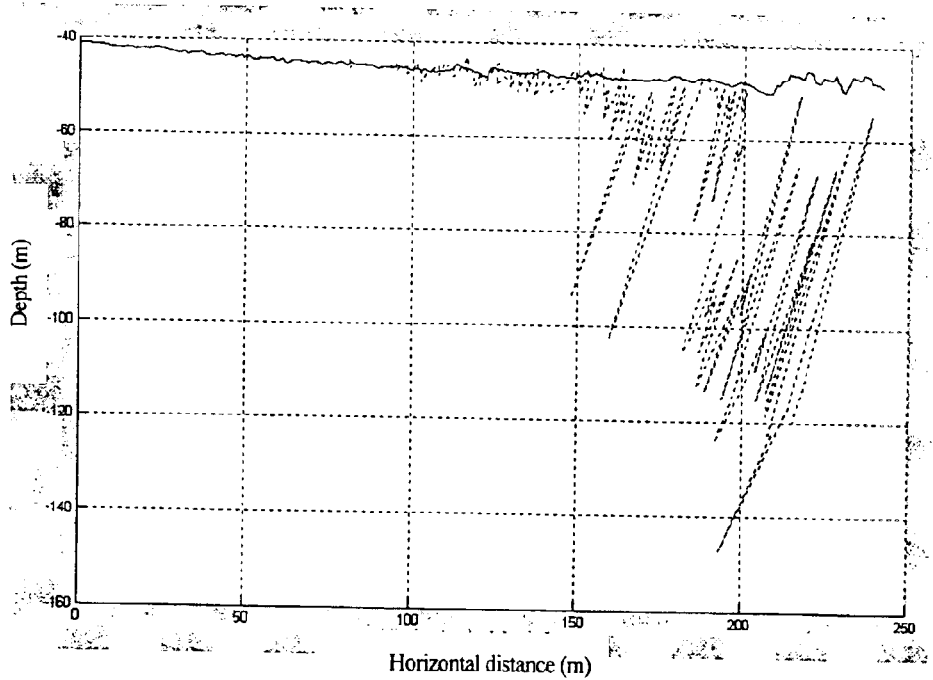
FIG. 16b is a figure shows the relationship between the horizontal distance and the depth.
Figure 17A:
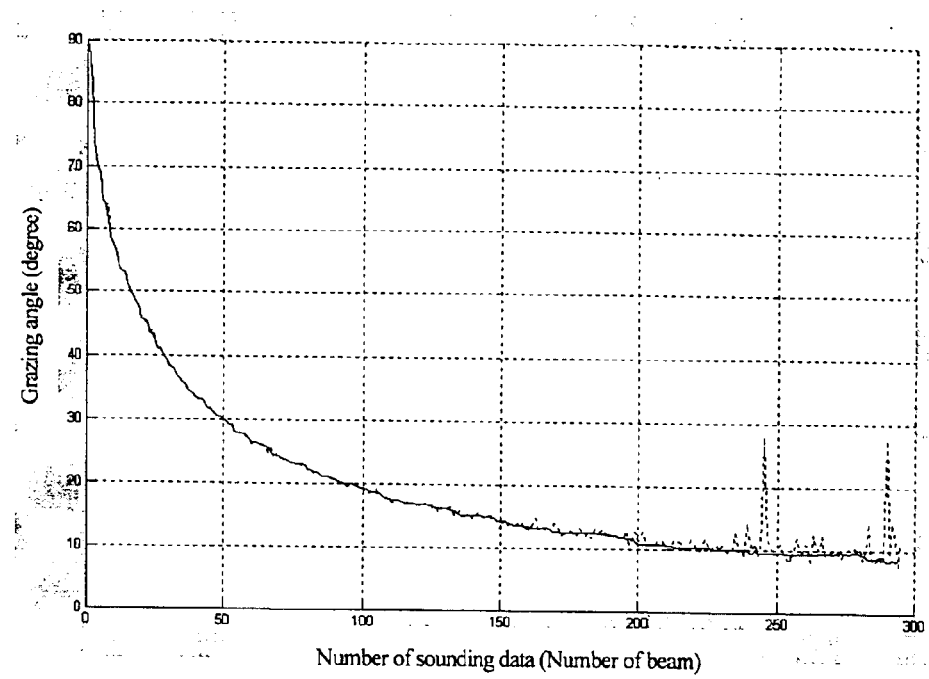
FIG. 17a is a figure shows the relationship between the number of the beams and the grazing angle.
Figure 17B:
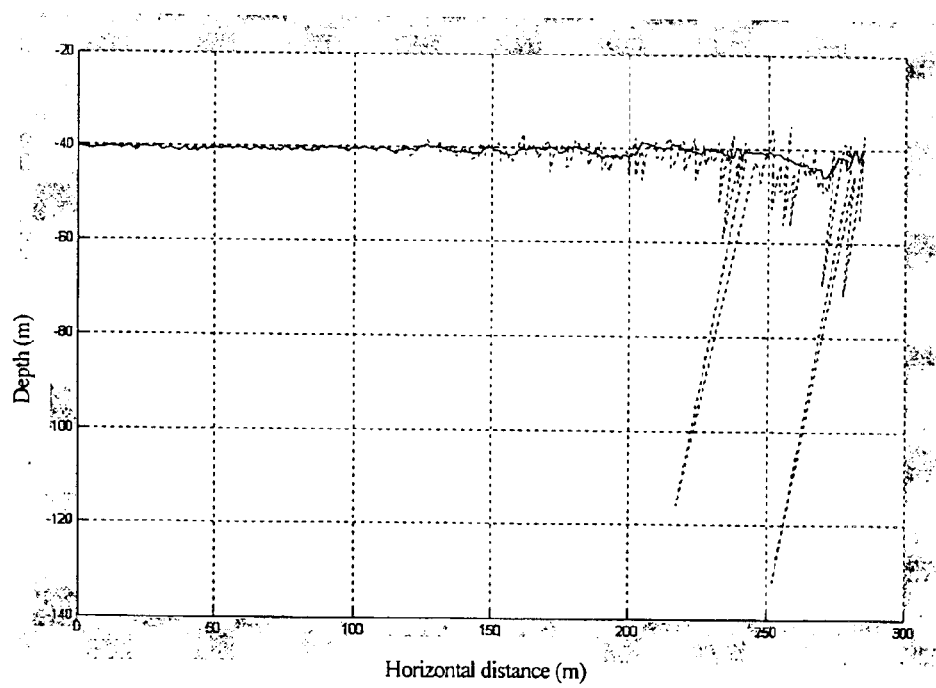
FIG. 17b is a figure shows the relationship between the horizontal distance and the depth.

Embodiment 2:

A high resolution bathymetric sidescan sonar system taking the lake bottom as the object to be measured is manufactured according to FIGS. 1–7, 10, and 11. Said system is set on the CR-02 AUV. The underwater electronic subsystem 1 and sonar arrays 3, 4 are mounted on said AUV 2, wherein said sonar arrays 3, 4 are mounted symmetrically on the both sides of the lower portion of the AUV 2. The construction of the underwater electronic subsystem is the same as that in the embodiment 1. The AUV 2 moves over the lake bottom at a height of 40–60 m and measures the micro-geomorphy of the lake bottom with the method of the invention. Said system still comprises two sonar arrays, each of the sonar arrays comprises a transmitting linear array and four parallel receiving linear arrays made of piezoelectric ceramic. The space of the linear arrays $d=\lambda$, $\lambda=2$ cm. The length of the linear array is 70 cm. The structure of the electronic subsystem is the same as that in embodiment 1. The result of depth measurement in the vicinity of the nadir of the AUV 2 by the method of the invention is given in FIG. 15. In the figure, the real line represents the measured results by the high resolution bathymetric sidescan sonar system of the embodiment 2, the dash line represents the measured results by the high resolution digital depth sounder. The technical specifications of the high resolution digital depth sounder are: operation frequency: 300 kHz, beam width: 4°, pulse width: 0.1 ms, transmitting rate: 10 times per second. It can be seen from the figure that the results obtained by both two methods coincide well. This situation indicates that the bathymetric precision may be achieved by the method and system of the invention. Such result can not be given by the prior art method. The results of depth measurement of the invention are shown in FIGS. 16, 17. FIG. 16 shows the measured results by the high resolution bathymetric sidescan sonar mounted on the AUV. The real line represents of the method of the invention, and the dash line represents the results of the prior art method. FIG. 16a is a figure showing the relationship between the number of the beams and the grazing angle. It can be seen from the figure that the data obtained by the method of the invention are still reasonable until the number of the beam reaches 200, but the data obtained by the prior art method can be regarded as reasonable only when the number of beams does not exceed 80. FIG. 16b is a figure showing the relationship between the horizontal distance and the depth. It can be seen from the figure that the data obtained by the method of the invention are still reasonable until the horizontal distance reaches 200 m; but the data obtained by the prior art method can be regarded as reasonable only when the horizontal distance is less than 80 m. FIG. 17 is the measured result of the other side, the reference signs and the conclusions are the same as those in connection to FIG. 16. It can be seen that the multipath signal is eliminated by the method and system of the invention, but the prior art method does not possess this capability. The precision of depth measurement, action distance and adaptability of the bathymetric side scan sonar system are increased significantly by the method of the invention. Besides, as shown in FIGS. 18, 19, three dimensional depth profile map and contour map (including the depth data of the nadir of the sonar) can be obtained by merging the data measured by the method and system of the invention and the attitude data and the positioning data of the underwater vehicle. These results can not be obtained by the prior art method and system.

Figure 14:
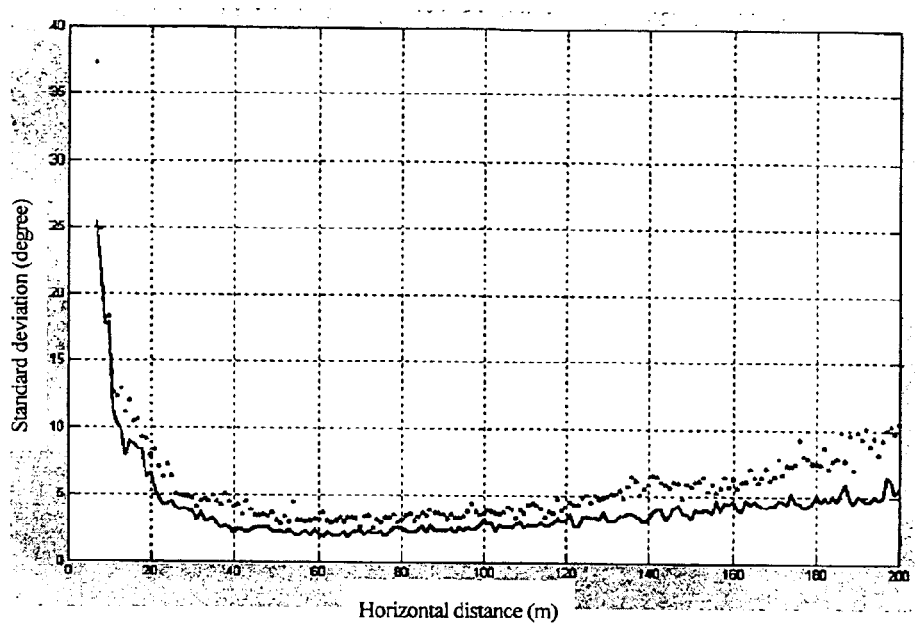
FIG. 14 is a figure showing the relationship between the standard deviations of the space-time correlation function of the sonar array of the invention and the horizontal distances. In the figure, - (real line) represents the results of the theoretical values, the mark * (star) represents the results obtained from the experimental value. It can be seen from the figure that the theoretical values are in coincidence well with the experimental values of the embodiment of the invention.

The sonar system of the invention of this embodiment as well as an attitude sensor and a navigation positioning sensor are mounted on the AUV and systematic tests are performed in a deep-water lake (its maximum depth is 150 m) for a long time. The following conclusions may be obtained from the experimental data:

a. As shown in FIG. 14, the theoretical values and the experimental values of the standard deviation of the phase of the space-time correlation function of the sonar array are coincidental well. This fact proves the correctness of our theory that is the theoretical basis of the high resolution bathymetric sidescan sonar system.

b. As shown in FIG. 15, as to the place in the vicinity of the nadir of the AUV, the depth data obtained from the AUV and the data obtained from a high resolution depth sounder mounted on the bottom of the AUV are coincidental well, the precision of depth measurement is superior to 1%. This fact proves the correctness of our theory. This makes the practicableness of the high resolution bathymetric side scan sonar. The technical specifications of the high precision depth sounder are: operation frequency: 300 kHz, beam width: 4°, pulse width: 0.1 ms, emission rate: 10 times/sec.

c. The multipath signal of the underwater acoustic channel can be separated completely by the SBAD-MSADOAE method of the invention. In light of this method, we can detect and track the bottom of water, delete the multipath signal, and obtain FIGS. 16, 17 without remain multipath signal.

d. We are capable of obtaining the corrected depth profile map (three dimensional depth map) for an extensive region, see FIG. 18.

e. We are capable of obtaining the corrected contour map for an extensive region, see FIG. 19.

For the purpose of understanding, the invention has been described with reference to Drawings and specific embodiments, but this description is not meant to be limited in these embodiments. Various modifications to the disclosed embodiments as well as alternative embodiments of the invention will become apparent to those skilled in the art upon reference to the description of the invention.

We claim:

1. A high resolution bathymetric sidescan sonar system for measuring micro-geomorphy of the sea bottom comprising:

an underwater vehicle, an underwater electronic subsystem mounted on the underwater vehicle and comprising a transmitter and a receiver, and two sonar arrays mounted symmetrically on two sides of a lower part of the underwater vehicle, and being connected to the underwater electronic subsystem through a cable, wherein the transmitter comprises a power amplifier having a last stage and the receiver comprises a preamplifier, wherein each sonar array comprises a transmitting linear array for converting a linear frequency modulated signal at an output of said transmitter into an acoustic pulse signal and transmitting said acoustic pulse signal to the sea bottom, said transmitting linear array being connected to the last stage of the power amplifier, and three or more parallel receiving linear arrays made of piezoelectric ceramic connected to the preamplifier of the receiver; and wherein the parallel receiving linear arrays are arranged at equal spaces, and the space d between two adjacent parallel receiving linear arrays is $\lambda > \geq \lambda/2$, in which $\lambda$ is a wavelength of an acoustic wave, and an operation frequency of the parallel receiving linear arrays ranges from 30 kHz to 1200 kHz.

2. The high resolution bathymetric sidescan sonar system for measuring micro-geomorphy of the sea bottom according to claim 1, wherein the space between the two adjacent parallel receiving linear arrays d is $\lambda/2$.

3. The high resolution bathymetric sidescan sonar system for measuring micro-geomorphy of the sea bottom according to claim 1, wherein said underwater electronic subsystem further comprises:

multiple receivers, multiple transmitters, a multiple-channel A/D converter, a high speed digital signal processor, an I/O controller, and a host computer, wherein the receivers are connected electrically to the multiple-channel A/D converter, the multiple-channel A/D converter is connected electrically to the high speed digital signal processor, the high speed digital signal processor is connected electrically to the host computer having a hard disk, and the I/O controller is connected electrically with the host computer, the transmitters, and the receivers.

4. The high resolution bathymetric sidescan sonar system for measuring micro-geomorphy of the sea bottom according to claim 3, wherein said underwater electronic subsystem further comprises an attitude sensor, a temperature sensor, or both, and the attitude sensor and the temperature sensor are connected electrically to the host computer via the I/O controller, respectively.

5. The high resolution bathymetric sidescan sonar system for measuring micro-geomorphy of the sea bottom according to claim 3, wherein said receivers comprise two receiver boards, a number of channels, and and a the number of the parallel receiving arrays to which said receiver boards are connected is the same, and each of the receiver boards operates at the same frequency; and wherein each of the receiver boards comprises a preamplifier, a time-varying gain controller, a band pass filter, a quadrature demodulator, two low pass filter, and two buffer amplifiers, wherein a weak signal received by a transducer is sent into an input terminal of the preamplifier, an output terminal of the preamplifier is connected to an input terminal of the time-varying gain controller, an output terminal of the time-varying gain controller is connected to an input terminal of the band pass filter, an output terminal of the band pass filter is connected to an input terminal of the quadrature demodulator, each of two output terminals of the quadrature demodulator is connected to an input terminal of a respective low pass filter, each of the output terminals of the two low pass filters is connected to an input terminal of each of two buffer amplifiers, and the output of each of the two buffer amplifiers is fed to the multiple-channel A/D converter.

6. The high resolution bathymetric sidescan sonar system according to claim 3, wherein said transmitters comprise two transmitter boards, their operation frequency is the same as that of the transmitting linear array to which said transmitters are connected; each transmitter comprises a carrier frequency generator, a signal converter, a driving stage, a power stage, and a transformer; in which a gate control signal outputted from the I/O controller is fed to an input terminal of the signal converter, an output of the carrier frequency generator is fed to an input terminal of the signal converter, an output terminal of the signal converter is connected to an input terminal of the driving stage, an output terminal of the driving stage is connected to an input terminal of the power stage, an output terminal of the power stage is connected to an input terminal of the transformer, and an output terminal of the transformer is connected to the sonar array.

7. The high resolution bathymetric sidescan sonar system for measuring micro-geomorphy of the sea bottom according to claim 3, wherein said multiple-channel A/D converter comprises a multiple-channel analog switch, an A/D converter, a FIFO memory, a logical controller, a clock generator, and DSP extended bus interface, wherein an output terminal of the multiple-channel analog switch is connected to an input terminal of the A/D converter, an output terminal of the A/D converter is connected to an input terminal of the FIFO memory, an output terminal of the FIFO memory is connected to the DSP extended bus interface, an output terminal of the clock generator is connected with the logical controller, an output of the logical controller is sent respectively to control signal input terminals of the multiple-channel analog switch, the A/D converter, and the FIFO memory, the logical controller is also connected with the DSP extended bus interface.

8. The high resolution bathymetric sidescan sonar system for measuring micro-geomorphy of the sea bottom according to claim 3, wherein said high speed digital signal processor comprises
- a digital signal processing chip,
- a dual port RAM,
- a static RAM,
- a logical controller,
- a host computer bus interface, and
- a DSP extended bus interface wherein said high speed digital signal processor chip is connected to one input terminal of the dual port RAM, the other input terminal of the dual port RAM is connected with the host computer bus interface, the digital signal processor chip is further connected with the static RAM and the DSP extended bus interface, the logical controller is connected with the digital signal processor chip, the static RAM, dual port RAM, and the host computer bus interface.

9. The high resolution bathymetric sidescan sonar system for measuring micro-geomorphy of the sea bottom according to claim 3, wherein said I/O controller comprises
- an OC gate digital output port,
- an 8-bit digital input port,
- a timer,
- a logical controller, and
- a host computer bus interface, wherein said logical controller is connected with the host computer bus interface, the timer, the OC gate digital output port, the 8-bit digital input port, and the D/A converter.

10. The high resolution bathymetric sidescan sonar system for measuring micro-geomorphy of the sea bottom according to claim 1 further comprising an overwater computer connected with a host computer over an ethernet link.

11. The high resolution bathymetric sidescan sonar system for measuring micro-geomorphy of the sea bottom according to claim 1, wherein said underwater vehicle is an AUV, ROV, towed system, or boat.

12. A method for measuring micro-geomorphy of the sea bottom by using the high resolution bathymetric sidescan sonar system of claim 1, comprising (1) Selecting an underwater vehicle which is an AUV, a tethered ROV, a towed system, or a boat;

(2) Drafting a preliminary overall specifications combining a theoretical formula of a standard deviation of phase of a space-time correlation function of the sonar system with a sonar equation to perform a design, selecting main specifications including an operation frequency, an action range, and a pulse width of the sonar system, and a length of the sonar array;

(3) Based on a theoretical expression of a phase additional factor in the space-time correlation function of the sonar array, selecting a beam width of an element unit of the linear array of the sonar array and the space between the linear arrays, thus a good precision of measurement in measuring in a vicinity of a nadir of the sonar system is obtained;

(4) Selecting the main specifications and repeating calculations in steps (2), (3) until the main specifications of the sonar system are fulfilled basically;

(5) Making a decision on a number of the equal-spaced parallel linear arrays to be used, in which the number equals or greater than three, then performing an analogous calculation with an SBAD-MSADOAE method, determining preliminarily a resolution of the sonar system and an ability for overcoming a multipath effect;

(6) Determining the main specifications of the sonar system, if the demands are not met, then the steps (2), (3), (4) and (5) are repeated, until the main specifications of the sonar system are determined, then manufacturing two prototypes of the sonar array;

(7) Testing the two prototypes of the sonar array manufactured in step (6) in a pool; first, measuring echoes from a pool bottom, comparing the measured depth values of the pool with its true depth values, including the depth values of the pool in the vicinity of the nadir of the sonar system, the measured values should coincide well with the corresponding true values; second, measuring the outline of the pool including its wall corners, the measured values should coincide basically with the corresponding true values, then an out door tests may be performed;

(8) Performing the tests on a lake or sea: testing the sonar array mounted on an underwater vehicle; performing the data processing after tests; first, comparing the depth values measured by the sonar in the vicinity of the nadir of the sonar system with the depth values measured by a high precision bathymeter, they should be coincidental well; second, operating the underwater vehicle in a case in which rather serious multipath effect exists, determining the ability of overcoming the multipath effect by the measured data, the correct depth values of the bottom of the water may be given on the finally obtained maps, without any multipath signal interference;

(9) Merging the data measured by the sonar system with the data from an attitude sensor on the underwater vehicle and the positioning data to give a contour map;

(10) Giving a grey scale map of an acoustic back scattering signal;

(11) Making a map.

13. A high resolution bathymetric sidescan system for measuring micro-geomorphy of the sea bottom comprising:
- an underwater electronic subsystem mounted on an underwater vehicle, said underwater electronic subsystem including:
  - at least one transmitter; and
  - at least one receiver; and
- a pair of sonar arrays mounted symmetrically on two sides of a lower part of the underwater vehicle connected to the underwater electronic subsystem, each of said sonar arrays including:
  - a transmitting linear array connected to said transmitter; said transmitting array transmitting an acoustic wave toward the sea bottom; and
  - at least three parallel equally spaced receiving linear arrays, each array being made of a piezoelectric ceramic material, connected to said receiver, the space between adjacent parallel receiving linear arrays being equal to d, where $\lambda > d \geq \lambda/2$, and $\lambda$ is the wavelength of the acoustic wave, the operation frequency of the parallel receiving linear arrays ranging from 30 kHz to 1200 kHz.

14. The high resolution bathymetric sidescan sonar system according to claim 13, wherein the space between the adjacent parallel receiving linear arrays d is $\lambda/2$.

15. The high resolution bathymetric sidescan sonar system according to claim 13, wherein said underwater electronic subsystem is provided with two transmitters and two receivers, the linear transmitting array of each of said pair of sonar arrays being connected electrically to one of said transmitters, and the receiving linear array of each of said pair of sonar arrays being connected electrically to one of said receivers, said underwater electronic subsystem further comprising:

a multi-channel A/D converter having an input connected electrically to said receivers;

a high speed digital signal processor connected electrically to said A/D converter;

a host computer having a hard disk connected electrically to said high speed digital signal processor; and an I/O controller connected electrically with said host computer, said transmitters, and said receivers.

16. The high resolution bathymetric sidescan sonar system according to claim 15, wherein said underwater electronic subsystem further comprises at least one of an attitude sensor and a temperature sensor, said attitude sensor and said temperature sensor being connected electrically to said host computer via said I/O controller, respectively.

* * * * *